UNITED STATES PATENT OFFICE.

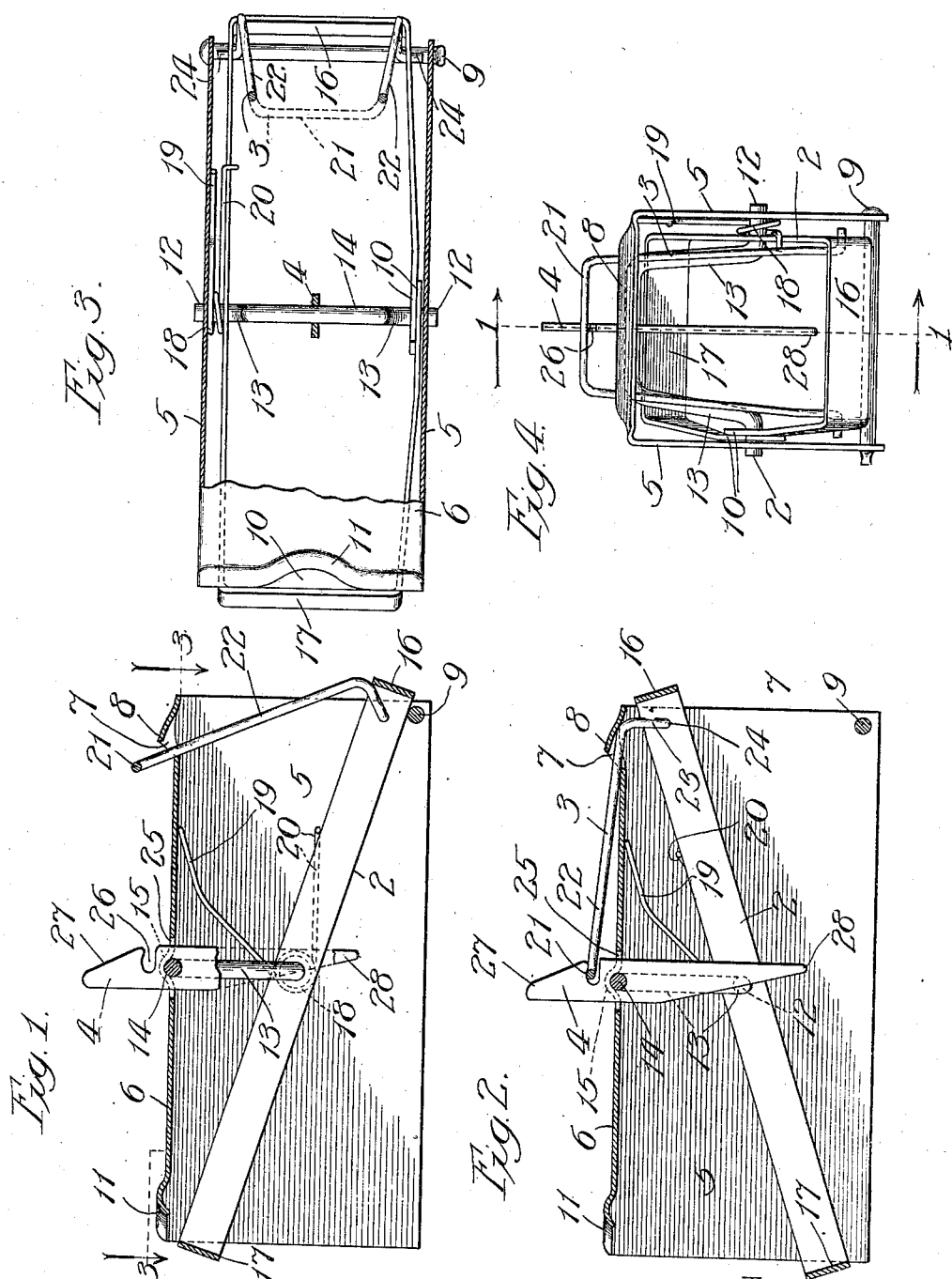

HERBERT A. STILSON, OF MORRISON, ILLINOIS.

TRAP.

995,733.  Specification of Letters Patent.  Patented June 20, 1911.

Application filed June 15, 1910. Serial No. 566,951.

*To all whom it may concern:*

Be it known that I, HERBERT A. STILSON, a citizen of the United States, residing at Morrison, in the county of Whiteside and State of Illinois, have invented a new and useful Improvement in Traps, of which the following is a specification.

My invention relates particularly to traps adapted for catching small animals, such as mice, rats and gophers; and my primary object is to provide a trap of improved construction and operation, which can be manufactured at a very small cost.

It may be preliminarily stated that the accompanying drawing shows my invention embodied in a double-ended trap, which is equipped with a double-acting striker-member, which is centrally pivoted, and one end of which works downwardly while the other ends works upwardly.

The accompanying drawing illustrates the preferred embodiment of the invention.

In the drawing:—Figure 1 represents a longitudinal section of a trap constructed in accordance with my invention, the section being taken at line 1—1 on Fig. 4 and the bait-holding arm of the latch-member being shown broken; Fig. 2, a similar section showing the trap in the "set" position; Fig. 3, a view partly in horizontal section and partly in plan, the section being taken as indicated at line 3—3, on Fig. 1; and Fig. 4, an end elevational view, looking toward the right hand end, as shown in Fig. 2.

In the form illustrated, the trap is double-ended, comprising a casing 1; a double-acting striker-member 2; a striker-holder 3; and a latch 4, the lower end of which is pointed and adapted to receive bait.

The casing may be of any desired form of construction. Preferably, it comprises a sheet-metal member bent to form sides 5 and a top 6, the casing being open at both ends. The top 6 of the casing is provided near one end with a slot 7, through which the member 3 extends, the metal being struck up adjacent one wall of said slot to afford a cam 8. The lower corners of the sides 5 are joined at one end of the casing by a rivet 9, which affords a striker-arrester, or stop. At the opposite end of the casing, the end edge of the casing-top is recessed somewhat, as shown at 10, and the end edge is provided with a bead 11, which adds finish to the casing.

The striker-member 2 is preferably of quadrilateral form, and may be formed by bending a steel bar to form the sides and ends of the parallelogram, the end-portions of the bar forming one long side of the parallelogram and the extremities overlapping for purposes of pivoting, as indicated at 10 in Figs. 3 and 4. The striker is supported centrally of its length by pivots 12, which may constitute the out-turned extremities of the down-turned arms 13 of a member of general U-shape, whose web 14 constitutes a pivot for the latch-member 4. At the central-portion of the casing-top, the metal is struck upwardly, as indicated at 15 to afford a recess or bearing for the web 14 of the arched pivot-member, it being observed that the pivot-member is thus securely held in place by reason of the fact that the web 14 lies in the recessed part 15, while the out-turned end of the arms, which afford the pivots for the striker-member project through the central-portions of the casing-sides 5.

As described, the striker-member 2 constitutes a double-striker, whose ends afford cross-members 16 and 17. The cross-member 16 is opposed to the striker arrester or rivet 9, while the cross-member 17 is opposed to the beaded end edge of the casing top at the opposite end of the casing. A spring 18 is coiled about one of the pivots 12, and has an arm 19 bearing against the lower surface of the casing-top, and an arm 20 which engages the striker 2 and tends to throw the striker to the position shown in Fig. 1.

The striker-holder 3 may be conveniently formed of wire, being preferably of general U-form, having a cross-web 21 and arms 22. The arms 22 extend through the slot 7 in the casing-top and have near their ends portions 23 bent at right angles to the main portions of the arms and having out-turned extremities 24 which extend through perforations with which the arms of the striker are provided near the cross-member 16. The latch-member 4 extends through a slot 25 with which the casing-top is provided centrally, and the upper portion of the member 4 is provided with a notch or recess 26 adapted to engage the cross-member 21 of the striker-holder 3. Above the notch 26, the corresponding edge of the member 4 is beveled, as indicated at 27, to facilitate the automatic engagement of the cross-member 21 with the notch 26. The lower end of the member 4 is pointed, as indicated at 28, being adapted to receive bait.

The trap may be "set" by applying the thumb to the cross-member 17 of the striker at the point 10 where the casing-top is recessed, and in the operation of depressing the cross-member 17 the opposite end of the striker will be elevated against the resistance of the spring 18. In this operation, the striker-holding member 3 will engage the cam 8 and swing the member 3 to the position shown in Fig. 2, in which position it becomes automatically locked. An animal may enter the trap from either end, passing beneath the cross-member 16 or above the cross-member 17 of the striker, depending upon which end is entered. When the trap is "sprung" the animal will be caught between the cross-member 16 and the striker-arrester 9, or between the cross-member 17 and the beaded end of the casing-top, depending upon which end of the trap is entered.

The trap described is of exceedingly simple and inexpensive construction and is very effective in operation, the trap presenting practically a clear run-way which invites the entrance of rodents or the like.

The foregoing detailed description has been given for clearness of understanding only, and no undue limitation is to be understood therefrom, but the appended claims are to be construed as broadly as permissible in view of the prior art.

What I regard as new and desire to secure by Letters Patent, is:—

1. A trap comprising a casing having entrances at opposite points, a centrally-pivoted, double-acting striker guarding the entrances, and having one end acting upwardly and the other downwardly, spring means for actuating the striker, and latching means.

2. A trap comprising a casing having opposite entrances, a centrally pivoted striker having one end acting upwardly and the other downwardly and guarding the entrances, a spring for actuating the striker, and latching means for the striker having a centrally located latch-member with a bait holding arm depending centrally within the casing.

3. A trap comprising a casing having opposite entrances, a centrally pivoted double-acting striker, a latch-member having its upper end projecting through the casing-top, a spring tending to depress one end of said striker, and a striker-holder pivotally connected with said striker near said end and adapted to engage said latch-member above the casing-top.

4. A trap comprising a casing having opposite entrances, a centrally pivoted double-acting striker, a latch-member pivoted near the casing-top and extending through the casing-top, a spring tending to depress one end of the striker, a striker-holder connected with the striker near said end, and cam-means serving to automatically guide the striker-holder into locking engagement with the latch when the striker is moved to the "set" position.

5. A trap comprising a casing having a top and sides, an upwardly arched pivot member having its arms provided at the lower ends thereof with out-turned extremities pivoted in the casing-sides, the web of said arched member lying adjacent to the casing-top, a striker pivoted on said out-turned extremities, a latch-member pivoted on said web, a striker-actuating spring, and a striker-holder pivotally connected with said striker and adapted to engage said latch.

6. A trap comprising a casing having a top and sides and open ends, a centrally pivoted double-acting striker, a cross-member joining the lower corners of the casing-sides at one end of the casing, the top of the casing at the opposite end being centrally recessed, a striker actuating spring, and means for automatically latching the striker when the end of the striker adjacent the recessed end of the casing-top is depressed.

7. A trap comprising a casing having a top and sides and open ends, a cross-member joining the lower corners of the casing-sides at one end of the casing, a centrally pivoted double-acting striker having one end normally adjacent said cross-member, and the other end normally adjacent the end edge of the casing-top at the other end of the casing, and adapted to be engaged and depressed in setting the trap, a striker actuating spring, a latch, a striker-holder, and means for automatically guiding the striker-holder into locking engagement with the latch in the operation of setting the trap.

8. A trap comprising a casing having a top and sides, an arched pivot member having a web lying in a transverse recess in the casing-top, said pivot member having downwardly extending arms provided with out-turned extremities entered in perforations in the casing-sides, a latch-member supported on the web of said pivot member and extending through a slot in the casing-top, a spring having a coiled portion encircling one of the out-turned extremities of the pivot member and having an arm engaging the striker, and a striker-holder adapted to engage said latch.

HERBERT A. STILSON.

In presence of—
W. C. STILSON,
H. J. LUDENS.

---

Copies of this patent may be obtained for five cents each, by addressing the "Commissioner of Patents, Washington, D. C."